Nov. 4, 1952  F. E. GODWIN  2,616,235
COTTON HARVESTER
Filed Sept. 15, 1948  3 Sheets-Sheet 1
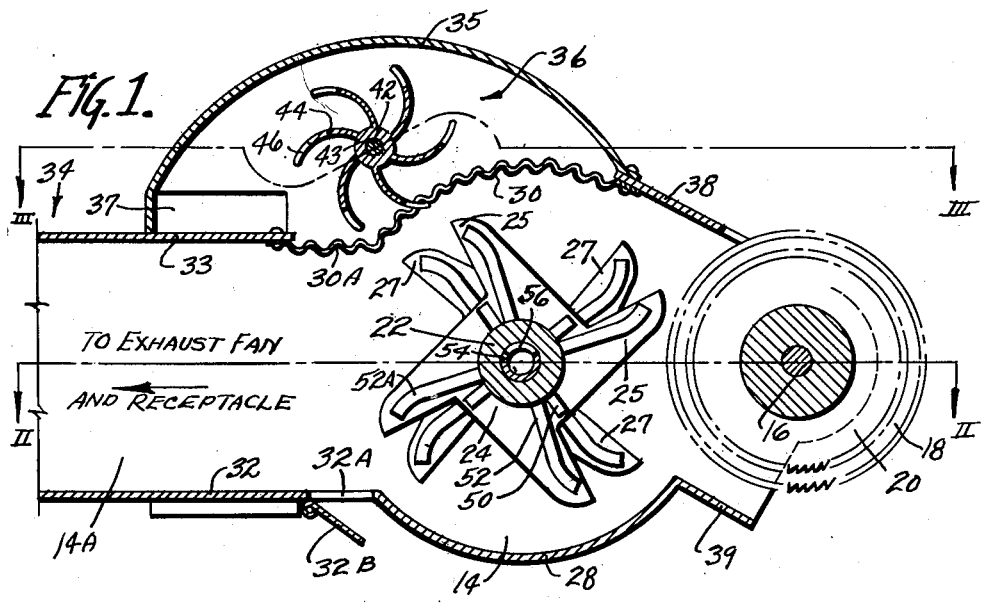
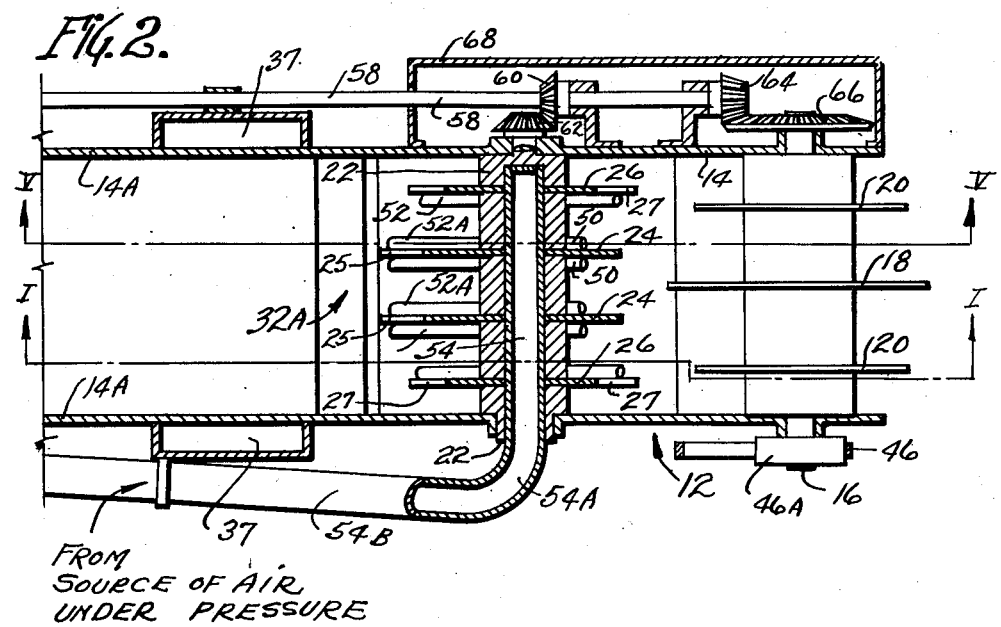
Inventor
FRANK E. GODWIN
By Weatherford and Weatherford
Attorneys Inventor
FRANK E. GODWIN
By Weatherford and Weatherford
Attorneys Nov. 4, 1952    F. E. GODWIN    2,616,235
COTTON HARVESTER
Filed Sept. 15, 1948    3 Sheets—Sheet 3

Inventor
FRANK E. GODWIN
By Weatherford and Weatherford
Attorney

Patented Nov. 4, 1952

2,616,235

UNITED STATES PATENT OFFICE 2,616,235

COTTON HARVESTER

Frank E. Godwin, Memphis, Tenn.

Application September 15, 1948, Serial No. 49,358

10 Claims. (Cl. 56—32)

This invention relates to improvement in cotton harvesting machinery of that type in which a cotton detaching head is directed toward the individual bolls of cotton, and in which the cotton is removed from the boll by fiber engaging means, of the type which employs a bank of saws or drums having short bristle-like teeth or spikes.

It particularly relates to a head of this type in which the cotton is detached from the saw or drum teeth by the combined action of beater blades and an exhaust flow of air, and in which the cotton is violently thrown from the beater blades by the combined action of centrifugal force and a blast of compressed air and is projected against a cleaning screen through which dust and the finer trash passes, and is subsequently traversed to a suitable receptacle by the action of the exhaust current of air.

The objects of the invention are:

To provide means for removing the cotton from the bolls and for detaching the cotton from the removing means and transferring it toward a receptacle;

To provide screening means, and detaching means which impels the cotton violently against the screening means;

To provide in connection with said detaching means, air discharging means which promotes release of the cotton from the detaching means and aids in impelling it against the screening means;

To provide air discharge means which promotes shift of the cotton along the surface of the screening means, and concurrent agitation of the cotton; and To provide additional means for assisting the agitation and progression of the cotton along the screening means.

The means by which the foregoing and other objects are accomplished, and the manner of their accomplishment, will readily be understood from the following specification on reference to the accompanying drawings, in which:

Fig. 1 is a vertical sectional elevation of the preferred form of head taken on the line I—I of Fig. 2.

Fig. 2 is a sectional plan view of the head taken on the line II—II of Fig. 1.

Figure 3:
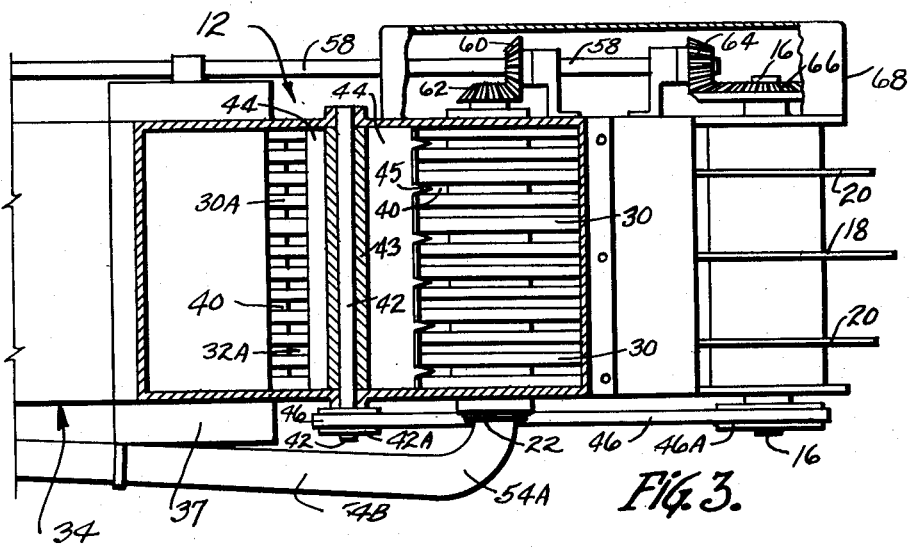
Fig. 3 is a sectional plan view of the head taken on the line III—III of Fig. 1, with the cover of the driving gears in part broken away and sectioned.

Referring now to the drawings in which the various parts are indicated by numerals:

The head comprises a hollow casing 12 preferably of substantially rectangular vertical section throughout, and which includes side walls 14 which journal at their forward ends a shaft 16 on which are secured a plurality of circular toothed discs or saws 18 and 20, the first of which is centrally disposed along the shaft, and the others of which are laterally and oppositely displaced from the central saw, preferably the central saw being somewhat larger than the side saws. Rearwardly spaced from the saws is an annular drum-like shaft 22 which is journalled at its opposite ends in the side walls 14. Secured on the shaft 22 are a plurality of disc-like strippers 24, 26, with outwardly continuing prongs 25 and 27 respectively, the forward edges of the prongs relatively to the direction of rotation, being substantially radial. The strippers 24 are respectively disposed between the saws, and strippers 26 outward from the outer saws. Preferably the prongs 27 of the outer strippers 26 are slightly advanced in the direction of blade rotation relatively to the prongs 25 of the strippers 24.

The side walls 14 beneath the strippers are connected by an arcuate wall 28 preferably concentric with the shaft 22, and above the strippers by an arcuate transverse corrugated screen 30, of which the major portion is also concentric with the shaft 22, and a minor portion 30A may continue rearwardly. The screen 30 is preferably made by cutting slots 40 transversely to the corrugation of a corrugated metal sheet, and arcuately curving the slotted sheet. Extending rearwardly from the arcuate wall 28 and the screen 30 are lower and upper wall portions 32, 33, which form with a narrowed portion 14A of the side walls a substantially rectangular flue 34 that extends rearwardly to a suitable receptacle, not here shown, into which the cotton is discharged. During operation an exhaust flow of air is maintained through the flue by suitable means not here shown. Adjacent the junction of the arcuate bottom 28 and the flue 34, the bottom flue wall 32 is provided with an opening 32A for air entrance, and with a shutter 32B through which regulation of the entering air is controlled.

Figure 4:
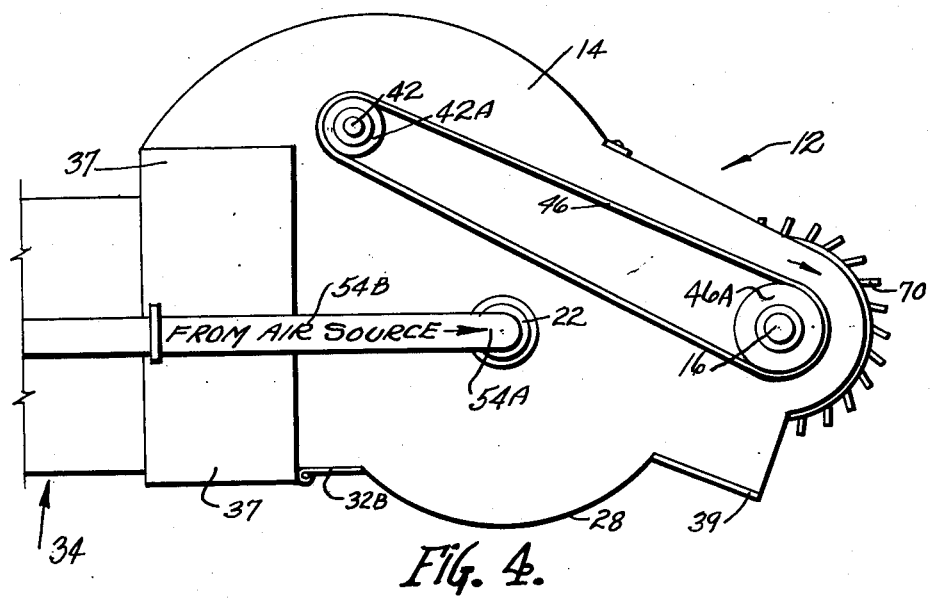
Fig. 4 is a side elevation indicating a spiked drum rather than saw type of cotton detaching means, and means for driving the agitating means.
Figure 5:
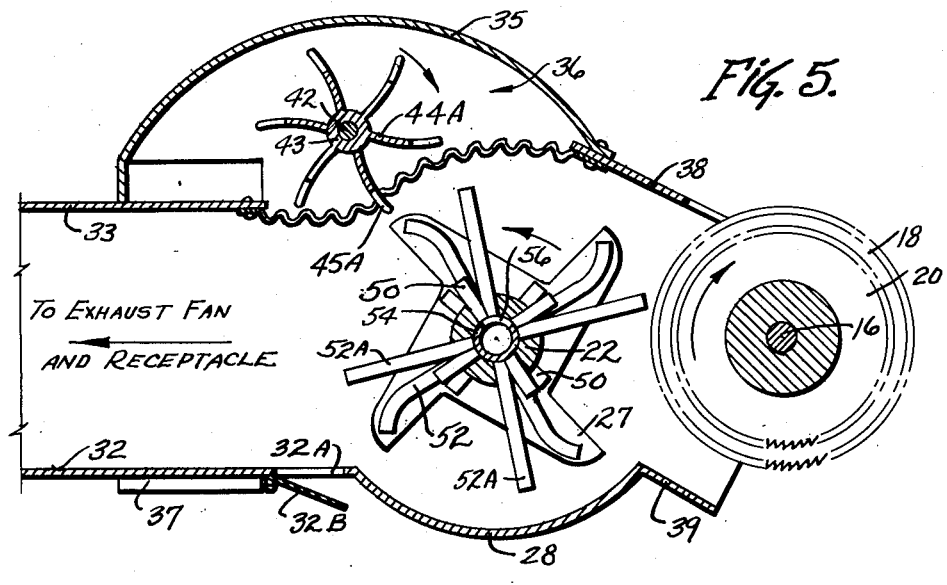
Fig. 5 is a vertical sectional elevation taken on the line V—V of Fig. 2.

The side walls 14 are extended above the screen 30 and are connected by an upper arcuate wall portion 35, establishing above the screen a dust chamber 36, from which dust escape flues 37 lead downward along the outside of the walls 14 to discharge. Forwardly of the junction of the screen 30 and the wall portion 36 an additional upper wall portion 38 extending into adjacency to the saws, also joins the side walls. Forwardly of the lower wall portion 28, an apron 39 extends into underlying relation with the rear halves of the saws. Disposed transversely across the dust chamber 37 is a shaft 42 which is carried by the side wall of the chamber and preferably carries a coextensive hub 43. Projecting from the hub 43 are blades 44 which preferably extend from side wall to side wall of the chamber and are arcuately curved in cross section to form cups against which air escaping through the screen 30 impinges. The blades 44 are provided at their outer ends with fingers 45 which extend through the slots 40 and tend to agitate cotton moving along the screen. If desired the hub 43 may be secured on the shaft 42 and the shaft journalled in the side walls. Also as shown in Fig. 4 the shaft may carry a pulley 42A and through a belt 46 may be driven from a pulley 46A on the saw shaft 16. The blades, as the blades 44A of Fig. 5, may have less curvature than the blades 44, or may, although not so shown, even be radial. The fingers 45A also may be longer and their rotation by the belt drive be used to speed up or slow down movement of the cotton along the screen.

Alongside each of the strippers 24, 26 are short pipes 50 and longer pipes 52 which communicate at their inner ends with the interior of the annular shaft 22 and extend outward therefrom, there being a short and a longer pipe for each of the prongs 25 or 27 of the strippers, the inner ends of the shorter and longer pipes of each pair being in adjacency at the inside of the wall of the annular shaft 22. The pipes extend radially through the wall of the shaft and open into the bore of the shaft. The shorter pipes at their outer ends terminate at the base of the forward sides of the prongs and discharge therealong, and the longer pipes extend outwardly along the prongs and some of them, if not all, at their outer ends curve forwardly in the direction of rotation of the blades. The two outer strippers 26 have one radial and one curved pipe for each of the prongs thereof, and the inner strippers 24 preferably have two sets, respectively on their opposite sides. In the latter case the long pipes on one side of the blade, as the pipes 52A (Fig. 5) are preferably straight, while the pipes 52 on the opposite side as shown in Fig. 1 are curved.

Disposed and journalled within the annular shaft 22 is a stationary air tube 54 closed at its inner end having a slot 56 extending between the outer pair of strippers 23. The tube 54 extends outward beyond one end of the shaft 22 and is rearwardly curved at 54A and extended at 54B toward and along a wall 14A of the discharge flue rearwardly to a suitable source, not shown, of air under pressure. The slot 56 has a width some one-quarter of the circumference of the tube 54 and is so positioned, when the tube is in place, that the inner end of each short pipe 50 is uncovered as the rotation of the stripper shaft moves it and the related stripper prongs into substantially upright positions, and almost immediately uncovers the inner ends of the longer pipes 52, 52A to more directly discharge against and through the cotton on the screen 30. This permits discharge of air from the short pipes to aid in freeing the cotton from the stripper prongs and to promote discharge of the cotton against the screen 30, and the subsequent action of air from the longer pipes on the cotton.

The shaft 22 is driven at a rotational speed of the nature of 1,800 R. P. M., and the shaft 16 at somewhat less than ¼ of the speed of the shaft 22. Preferably if the shaft 22 be rotated at 1,800 R. P. M. the shaft 16 is rotated about 400 R. P. M., but neither of these speeds is critical. These rotations may be accomplished in any suitable or desired manner, preferably through a shaft 58, which is driven by suitable means not shown. The shaft may be flexible, and extend along one of the side walls 14A of the discharge flue. The drive of shaft 22 is accomplished from the shaft 58 as by bevel pinions 60, 62 respectively mounted on the shaft 58 and the shaft 22. The shaft 58 may be extended beyond the pinion 60 and through a pinion 64 and relatively larger gear 66 mounted on the shaft 16 accomplish the rotation of that shaft. Preferably the gears are protected by a housing 68.

In Fig. 4 drum carried teeth or spikes 70 are shown in lieu of the saws 18 and 20, the construction otherwise being substantially unchanged.

It will be understood that the terms pipes, tube, and flue are used to avoid as far as possible confusion of the parts to which they relate, rather than as definitive of such parts.

It will be further understood that the arrows indicate directions of air flow or other movements, or of rotation of shafts.

In operation, the saws and other rotating parts of the picker head are brought up to speed and the saws are directed manually against the cotton fiber in each of the bolls respectively. The saw teeth engage the fiber and remove the fiber and seed and transfer it into the head. The stripper prongs brush the cotton loose from the saws and tend to throw the so detached cotton against the screen 30. As each prong successively comes into alinement with the screen the inner ends of the short pipes 50 are uncovered by movement of the slot 56 of the stationary air tube 54, and an air blast released which assists centrifugal action in releasing the cotton from the prongs and throwing it against the screen. Immediately thereafter as the rotation of the blades continues the inner ends of the longer curved air pipes 52, and straight pipes 52A are uncovered and a blast of air therefrom is directed against the cotton moving toward, and that which may be against the screen, imparting an agitating and turning movement to the locks, and tending to propel the cotton rearwardly toward the flue 34. In these actions the air drawn into the picker head along the apron 39 below the saws and between the saws aids in moving the cotton into the head and resists centrifugal action of the stripper prongs until they successively move toward alinement with the screen and thereafter aids in moving the cotton along the screen and subsequently traverses it rearwardly through the flue 34 toward the receptacle (not shown).

The cotton thrown against the screen 30 and agitated and traversed therealong releases dust and smaller trash through the screen slots into the dust chamber 36. As the cotton moves along the screen some of the air from the pipes 50 and 52, and most of the air from the pipes 52A, passes through the screen and engages the cupped sides of the blades 44 of the agitator causing these blades to turn and their projecting fingers 46 to momentarily deflect the cotton from the screen and assist in the agitation of the cotton. Should the agitator be driven and coordinated with the speed of the saws, as shown in Fig 4, additional air for conveying the cotton through the flue 34 may be had by opening the shutter 32B as desired. The agitator blade fingers assist in the movement of the cotton if such movement along the screen is sluggish and retard the movement should it be too rapid to allow desired cleaning action.

I claim:

1. In a cotton picking device which includes cotton detaching means and means for driving said detaching means; means for removing cotton from said detaching means comprising a rotatably mounted hollow shaft, a plurality of stripper prongs carried by and extending from said shaft into cooperative adjacency with said detaching means, a like plurality of passageways communicating at their inner ends with said hollow shaft, said passageways being respectively associated with and extending along said prongs, an air tube within said shaft, said tube being slotted along one side and communicating with said shaft along said slot, means connected to said tube for delivering air under pressure into said tube, means for rotating said shaft to successively present said prongs for cooperating with said detaching means, and to successively move said passageways into registry with said slot to receive therefrom said air under pressure during a limited arc of rotation.

2. In a cotton picking device which includes cotton detaching means and means for driving said detaching means; means for removing cotton from said detaching means comprising a rotatably mounted hollow shaft, a plurality of stripper prongs carried by and extending from said shaft into cooperative adjacency with said detaching means, a like plurality of pipes communicating at their inner ends with said hollow shaft, said pipes being respectively associated with and extending along said prongs with their outer ends disposed adjacent the outer ends of said prongs, an air tube within said shaft, said tube being slotted along one side and communicating with said shaft along said slot, said slot facing away from said detaching means, means connected to said tube for delivering air under pressure into said tube, means for rotating said shaft to successively present said prongs for cooperating with said detaching means, and to successively move said pipes into registry with said slot to receive therefrom said air under pressure during a limited arc of rotation subsequent to prong cooperation with said detaching means, said pipes delivering said received air adjacent said prong outer ends.

3. In a cotton picking device which includes cotton detaching means and means for driving said detaching means; means for removing cotton from said detaching means comprising a rotatably mounted hollow shaft, a plurality of stripper prongs carried by and extending from said shaft into cooperative adjacency with said detaching means, a like plurality of pipes communicating at their inner ends with said hollow shaft, said pipes being respectively associated with and extending along said prongs, and having at their outer ends curved tip sections, an air tube within said shaft, said tube being slotted along one side and communicating with said shaft along said slot, said slot facing away from said detaching means, means connected to said tube for delivering air under pressure into said tube, means for rotating said shaft to successively present said prongs for cooperating with said detaching means, and to successively move said pipes into registry with said slot to receive therefrom said air under pressure during a limited arc of rotation subsequent to prong cooperation with said detaching means, said pipe tip sections being curved in the direction of rotation of said shaft to direct air under pressure received from said slot in said direction of rotation.

4. In a cotton picking device which includes cotton detaching means and means for driving said detaching means; means for removing cotton from said detaching means comprising a rotatably mounted hollow shaft, a plurality of stripper prongs carried by and extending from said shaft into cooperative adjacency with said detaching means, a like plurality of major pipes and of minor pipes communicating at their inner ends with said hollow shaft, each said prong having a major and a minor pipe associated with it, said major pipes extending along and being substantially coextensive in length with said prongs, each said major pipe at its outer end being provided with a curved tip section, said minor pipes being respectively angularly disposed relative to their related major pipes, an air tube within said shaft, said tube being slotted along one side and communicating with said shaft along said slot, said slot facing away from said detaching means, means connected to said tube for delivering air under pressure into said tube, means for rotating said shaft to successively present said prongs for cooperating with said detaching means, and to successively move said major and minor pipes into registry with said slot to receive therefrom said air under pressure during a limited arc of rotation subsequent to prong cooperation with said detaching means, said major pipe tip sections being curved in the direction of rotation of said shaft, to direct air under pressure received from said slot in said direction of rotation.

5. A cotton picking and cleaning head which comprises a forwardly open housing, rotary cotton detaching means journalled in the forward end of said housing, means for removing cotton from said detaching means journalled in said housing rearwardly of and in cooperative adjacency to said detaching means, an arcuate screen sector within and spaced from said housing disposed around a sector of said removing means and offset from said detaching means, said screen being corrugated transversely to its curvature and being circumferentially slotted; agitating means, including a transversely disposed hub journalled in said housing radially outward from said screen, blades extending from said hub and provided with fingers dimensioned to extend through said slots; means for driving said detaching means and for rotating said removing means rearwardly relative to said screen, said removing means including a transversely disposed hollow shaft journalled within said housing, a plurality of stripper prongs carried by and extending from said shaft into cooperative adjacency with said detaching means, a like plurality of pipes communicating at their inner ends with said hollow shaft, said pipes being respectively associated with and extending along said prongs and having at their outer ends tip sections curved in the direction of rotation of said shaft, a non-rotary air tube within said shaft, said tube being slotted along one side and communicating with said shaft along said slot, said slot facing said arcuate screen sector, means connected to said tube for delivering air under pressure into said tube, rotation of said shaft successively presenting said prongs for cooperation with said detaching means, and successively moving said pipes into register with said slot and said screen to receive from said slot said air under pressure during a limited arc of rotation subsequent to prong cooperation with said detaching means, said pipes delivering said received air under pressure adjacent the ends of said prongs and against and through said screen, whereby to dislodge cotton from said removing means and against and along said screen, the fingers of said agitating means engaging and moving cotton impinged against said screen, and to dislodge dirt and trash from said cotton and discharge said dirt and trash entrained with said delivered air into the space surrounding said screen remote from said removing means.

6. A cotton picking and cleaning head which comprises a housing, cotton detaching means mounted in and extending outwardly beyond said housing, means for removing cotton from said detaching means journalled in said housing inwardly of and in cooperative adjacency to said detaching means, a screen sector within said housing disposed with one side adjacent a sector of said removing means and offset from said detaching means, said screen being slotted; agitating means, including a hub journalled in said housing spaced from the other side of said screen, said hub being provided with fingers dimensioned to extend through said slots; means for driving said detaching means and for rotating said removing means inwardly relative to said screen, said removing means including a hollow shaft journalled within said housing, a plurality of stripper prongs carried by and extending from said shaft into cooperative adjacency with said detaching means, a like plurality of passageways each communicating with said hollow shaft, respectively associated with said prongs, air pressure supply means within said shaft facing toward said screen sector, rotation of said shaft successively presenting said prongs for cooperation with said detaching means, and successively moving said passageways into register with said air supply means and said screen to receive from said supply means air under pressure during a limited arc of rotation subsequent to prong cooperation with said detaching means, said passageways delivering said received air under pressure to said prongs and against and through said screen, whereby to dislodge cotton from said removing means and against and along said screen, the fingers of said agitating means engaging and moving cotton impinged against said screen, and to dislodge dirt and trash from said cotton and discharge dirt and trash entrained with said delivered air beyond the said other side of said screen.

7. A cotton picking device including a housing, cotton detaching means journalled in and projecting outwardly from said housing, rotary cotton removing means, means for rotating said removing means, said removing means being enclosed in said housing in cooperative adjacency to said detaching means and comprising a shaft journalled in said housing, a plurality of stripper prongs carried by said shaft, air jetting means respectively associated with said prongs, a screen, mounted in said housing with one side adjacent said removing means, having an arcuate sector concentric with said shaft, said air jetting means being positioned in alinement with said arcuate screen sector to successively deliver air jets to said prongs as said prongs are moved into alinement with said screen sector during shaft rotation, to dislodge cotton from said prongs toward and against said screen sector, a rotatable agitator journalled in said housing adjacent the opposite side of said screen, said agitator including a plurality of fingers, said arcuate section being slotted and said fingers being positioned and dimensioned to successively extend through said slots upon agitator rotation to engage and move cotton discharged against said screen sector by said air jets.

8. A cotton picking device including a housing, cotton detaching means journalled in and projecting outwardly from said housing, rotary cotton removing means, means for rotating said removing means, said removing means being enclosed in said housing in cooperative adjacency to said detaching means and comprising a hollow shaft journalled in said housing, a plurality of stripper prongs carried by said shaft, air jetting means comprising passageways respectively associated with said prongs and communicated with the interior of said shaft, and means connected to the interior of said shaft for supplying air under pressure to said shaft, an apertured screen mounted in said housing with one side adjacent said removing means, said air supply means being positioned in alinement with said screen to successively deliver air jets through said passageways to said prongs as said prongs are moved into alinement with said screen during shaft rotation, to dislodge cotton from said prongs toward and against said screen, impingement of dislodged cotton against said screen dislodging dirt and trash from said cotton, said dirt and trash entrained with said jetted air discharging through said screen.

9. A cotton picking device including a housing, cotton detaching means journalled in and projecting outwardly from said housing, cotton removing means enclosed in said housing in cooperative adjacency to said detaching means, comprising a shaft journalled in said housing and a plurality of stripper prongs carried by said shaft, a screen mounted in said housing with one side adjacent said removing means, having an arcuate section concentric with said shaft, a rotatable agitator journalled in said housing adjacent the opposite side of said screen, said agitator including a plurality of fingers, said arcuate section having apertures and said fingers being positioned to successively extend through said apertures upon agitator rotation.

10. A cotton picking device including a housing, cotton detaching means journalled in and projecting outwardly from said housing, cotton removing means enclosed in said housing in cooperative adjacency to said detaching means, comprising a shaft journalled in said housing and a plurality of stripper prongs carried by said shaft, a screen mounted in said housing with one side adjacent said removing means, a rotatable agitator journalled in said housing adjacent the opposite side of said screen, said agitator including a plurality of fingers, said screen having apertures and said fingers being positioned to successively extend through said apertures upon agitator rotation.

FRANK E. GODWIN.

REFERENCES CITED

The following references are of record in the file of this patent:

UNITED STATES PATENTS

| Number | Name | Date |
| --- | --- | --- |
| 948,619 | Thomas | Feb. 8, 1910 |
| 1,638,867 | Melton | Aug. 16, 1927 |
| 1,687,571 | Kieffer | Oct. 16, 1928 |
| 1,713,397 | Rountree | May 14, 1929 |
| 1,828,581 | Watson | Oct. 20, 1931 |
| 1,918,620 | Taliaferro | July 18, 1933 |
| 1,927,723 | Taliaferro | Sept. 19, 1933 |
| 2,049,640 | Conrad | Aug. 4, 1936 |